(12) United States Patent
Chen

(10) Patent No.: US 11,032,860 B2
(45) Date of Patent: Jun. 8, 2021

(54) METHOD, APPARATUS, AND DEVICE FOR AUTOMATIC PAIRING OF WIRELESS DEVICES

(71) Applicant: Spreadtrum Communications (Shanghai) Co., Ltd., Shanghai (CN)

(72) Inventor: Guochu Chen, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/575,620

(22) Filed: Sep. 19, 2019

(65) Prior Publication Data

US 2020/0314926 A1 Oct. 1, 2020

(30) Foreign Application Priority Data

Mar. 29, 2019 (CN) .......................... 201910246771.1

(51) Int. Cl.
*H04W 76/14* (2018.01)
*H04W 8/00* (2009.01)
*H04W 4/80* (2018.01)
*H04W 4/08* (2009.01)
*H04W 8/26* (2009.01)

(52) U.S. Cl.
CPC ............ *H04W 76/14* (2018.02); *H04W 4/08* (2013.01); *H04W 4/80* (2018.02); *H04W 8/005* (2013.01); *H04W 8/26* (2013.01)

(58) Field of Classification Search
CPC ......... H04W 76/14; H04W 4/80; H04W 4/08; H04W 8/26; H04W 8/005
See application file for complete search history.

(56) References Cited

U.S. PATENT DOCUMENTS

| | | | |
|---|---|---|---|
| 8,817,642 B2* | 8/2014 | Donaldson | H04W 4/00 370/252 |
| 10,200,791 B1* | 2/2019 | Liu | H04R 5/033 |
| 2011/0078445 A1* | 3/2011 | Xiao | H04L 63/105 713/171 |
| 2015/0359022 A1* | 12/2015 | Lau | H04W 76/14 455/41.2 |

(Continued)

FOREIGN PATENT DOCUMENTS

| | | |
|---|---|---|
| CN | 105471481 A | 4/2016 |
| CN | 105472488 A | 4/2016 |
| CN | 107071618 | 8/2017 |

(Continued)

*Primary Examiner* — Peter P Chau
(74) *Attorney, Agent, or Firm* — Finnegan, Henderson, Farabow, Garrett & Dunner, LLP

(57) ABSTRACT

Methods and apparatuses for communication include: after a data source device discovers a first device in a device group based on a group identifier, pairing the first device with the data source device based on the group identifier to obtain pairing information; transmitting a notification message from the first device to one or more other devices in the device group, the notification message including an instruction to update a status of each of the one or more other devices in the device group to be invisible to a device outside the device group; and providing the pairing information to a second device in the device group, the pairing information being used for establishing a connection between the second device and the data source device.

42 Claims, 11 Drawing Sheets

(56) References Cited

U.S. PATENT DOCUMENTS

2019/0319685 A1* 10/2019 Chen .................... H04B 7/0608
2020/0008048 A1*  1/2020 Takahashi ............. H04W 76/10

FOREIGN PATENT DOCUMENTS

| CN | 107333339 A | 11/2017 |
| CN | 107894881   |  4/2018 |
| CN | 108323246 A |  7/2018 |
| CN | 108901004   | 11/2018 |
| CN | 109391724 A |  2/2019 |
| CN | 109495867   |  3/2019 |

* cited by examiner

METHOD, APPARATUS, AND DEVICE FOR AUTOMATIC PAIRING OF WIRELESS DEVICES

CROSS-REFERENCE TO RELATED APPLICATIONS

This application is based upon and claims priority to Chinese Application No. 201910246771.1, filed on Mar. 29, 2019, the entire contents of which are incorporated herein by reference.

TECHNICAL FIELD

This disclosure relates to electronics technology, and particularly, to methods, apparatuses, and devices for communication.

TECHNICAL BACKGROUND

In a wireless system, data exchange may take place between a data source device and various forms of wireless devices. As user demand increases, the number of wireless devices connected to the data source device to exchange data may increase. In many application scenarios, data from the data source device needs to be transmitted to multiple wireless devices. For example, a mobile phone may need to transmit audio to two Bluetooth® earbuds. When data needs to be transmitted from one data source device to multiple wireless devices, the data source device may be first paired and connected with a primary wireless device among the multiple wireless devices. The data source device may transmit data to the primary wireless device, which may then transmit the data to a secondary wireless device. However, failure of connection between the data source device and the primary wireless device may affect data transmission to other wireless devices, causing low communication reliability.

SUMMARY

Consistent with the present disclosure, there is provided a method for communication. The method includes: after a data source device discovers a first device in a device group based on a group identifier, pairing the first device with the data source device based on the group identifier to obtain pairing information, the device group identifier uniquely identifying the device group, wherein a status of each device in the device group is set as visible to one or more devices outside the device group, devices in the device group are identified to the one or more devices outside the device group by the group identifier, and the pairing information is generated by the first device using the group identifier and an identifier of the data source device; transmitting a notification message from the first device to one or more other devices in the device group, the notification message including an instruction to update a status of each of the one or more other devices in the device group to be invisible to the one or more devices outside the device group; and providing the pairing information to a second device in the device group, the pairing information being used for establishing a connection between the second device and the data source.

In another aspect, there is provided a method for communication. The method includes: before establishing a connection between a first device and a data source device, obtaining, by a second device, pairing information provided by the first device, wherein the first device and the second device are in a device group, the pairing information is obtained by pairing the first device with the data source device based on a group identifier, the group identifier uniquely identifying the device group, before pairing the first device with the data source device via the group identifier to obtain the pairing information, a status of each device in the device group is set as visible to a device outside the device group, and devices in the device group are identified to the device outside the device group by the group identifier; receiving, by the second device, a notification message transmitted by the first device and updating, by the second device, a status of the second device to be invisible to the device outside the device group in accordance with the notification message; and establishing a connection between the second device and the data source device based on the pairing information.

In a third aspect, there is provided apparatus for communication, which is applied to a first device. The apparatus includes a processing module and a transmission module. The processing module is for pairing with a data source device based on a group identifier to obtain pairing information after the data source device discovers the first device in the device group based on the group identifier, wherein the first device is any one of devices in the device group, the group identifier uniquely identifies the device group, before pairing the first device with the data source device based on the group identifier to obtain the pairing information, a status of each device in the device group is set as visible to one or more devices outside the device group, the devices in the device group are identified to the one or more devices outside the device group by the group identifier, and the pairing information is generated by the first device in accordance with the group identifier and an identifier of the data source device. The transmission module is for transmitting a notification message to one or more other devices in the device group, the notification message including an instruction to update a status of each of the one or more other devices in the device group to be invisible to the one or more devices outside the device group; and the transmission module is further for providing the pairing information to a second device in the device group, the pairing information being used for establishing a connection between the second device and the data source device.

In a fourth aspect, there is provided an apparatus for communication, which is applied to a second device. The apparatus includes a processing module and a transmission module. The transmission module is for obtaining pairing information provided by a first device before a connection is established between the first device and a data source device, wherein the first device and the second device are in a device group, the pairing information is obtained by pairing the first device with the data source device based on a group identifier, the group identifier uniquely identifying the device group, before the first device is paired with the data source device via the group identifier to obtain the pairing information, a status of each device in the device group is set as visible to a device outside the device group, and devices in the device group are identified to the device outside the device group by the group identifier. The transmission module is further for receiving a notification message transmitted by the first device and updating, by the second device, a status of the second device to be invisible to the device outside the device group in accordance with the notification message. The processing module is used for establishing a connection with the data source device based on the pairing information.

In a fifth aspect, there is provided a communication apparatus comprising a storage device and a processor. The processor executes a program instruction in the storage device to implement the method of: after a data source device discovers a first device in a device group based on a group identifier, pairing the first device with the data source device based on the group identifier to obtain pairing information, the device group identifier uniquely identifying the device group, wherein a status of each device in the device group is set as visible to one or more devices outside the device group, devices in the device group are identified to the one or more devices outside the device group by the group identifier, and the pairing information is generated by the first device using the group identifier and an identifier of the data source device; transmitting a notification message from the first device to one or more other devices in the device group, the notification message including an instruction to update a status of each of the one or more other devices in the device group to be invisible to the one or more devices outside the device group; and providing the pairing information to a second device in the device group, the pairing information being used for establishing a connection between the second device and the data source.

In a sixth aspect, there is provided a communication apparatus comprising a storage device and a processor. The processor executes a program instruction in the storage device to implement the method of: before establishing a connection between a first device and a data source device, obtaining, by a second device, pairing information provided by the first device, wherein the first device and the second device are in a device group, the pairing information is obtained by pairing the first device with the data source device based on a group identifier, the group identifier uniquely identifying the device group, before pairing the first device with the data source device via the group identifier to obtain the pairing information, a status of each device in the device group is set as visible to a device outside the device group, and devices in the device group are identified to the device outside the device group by the group identifier; receiving, by the second device, a notification message transmitted by the first device and updating, by the second device, a status of the second device to be invisible to the device outside the device group in accordance with the notification message; and establishing a connection between the second device and the data source device based on the pairing information.

In a seventh aspect, there is provided a device group comprising a first communication apparatus and a second communication apparatus. The first communication apparatus comprises a first storage device and a first processor. The first processor executes a first program instruction in the first storage device to implement a first method of: after a data source device discovers a first device in a device group based on a group identifier, pairing the first device with the data source device based on the group identifier to obtain pairing information, wherein the group identifier uniquely identifies the device group, before pairing the first device with the data source device via the group identifier to obtain the pairing information, a status of each device in the device group is set as visible to a device outside the device group, devices in the device group are identified to the device outside the device group by the group identifier, and the pairing information is generated by the first device using the group identifier and an identifier of the data source device; transmitting a notification message from the first device to one or more other devices in the device group, the notification message including an instruction to update a status of each of the one or more other devices in the device group to be invisible to the device outside the device group; and providing the pairing information from the first device to a second device in the device group. The second communication apparatus comprises a second storage device and a second processor. The second processor executes a second program instruction in the second storage device to implement a second method of: before establishing a connection between the first device and the data source device, obtaining, by the second device, the pairing information provided by the first device; receiving, by the second device, the notification message transmitted by the first device and updating, by the second device, a status of the second device to be invisible to the device outside the device group in accordance with the notification message; and establishing a connection between the second device and the data source device in accordance with the pairing information.

In an eighth aspect, there is provided a communication system comprising the aforementioned device group in the seventh aspect and a data source device. The devices in the device group are capable of being paired with the data source device via the group identifier.

In a ninth aspect, there is provided a non-transitory computer-readable storage medium comprising a computer program stored thereon. The computer program, when being executed by a processor, implements the first method in the first aspect or the second method in the second aspect.

BRIEF DESCRIPTION OF THE DRAWINGS

Drawings are provided herewith to assist the illustration of the methods, devices, and systems of this disclosure. The drawings include the following.

DETAILED DESCRIPTION

This disclosure provides a communication method for a group of wireless devices. For example, after a first device pairs with an external device via the group identifier, the first device may obtain and transmit pairing information to at least one second device in the device group so that the second device may connect with the external device using the pairing information. The disclosed embodiments enhance user experience, increase efficiency of the connection establishment process, and improve communication efficiency and reliability.

Figure 1:
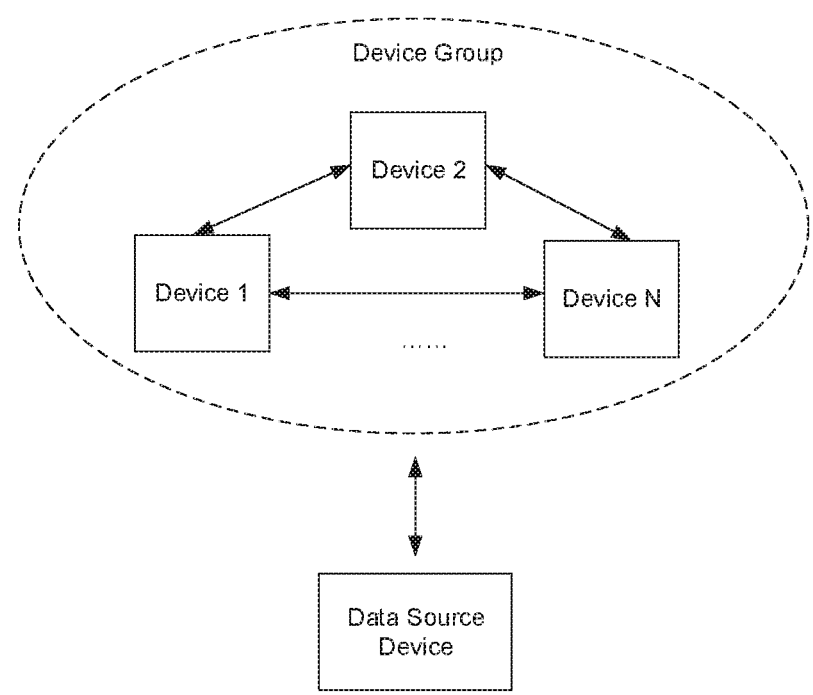
FIG. 1 is a schematic diagram of an exemplary communication system consistent with embodiments of this disclosure.

FIG. 1 is a schematic diagram of an exemplary communication system 100 consistent with embodiments of this disclosure. The system 100 comprises device 1, device 2, . . . , device N (N being an integer), and a data source device. In FIG. 1, device 1, device 2, . . . , and device N are paired with and connected to each other and form a device group, and the devices in the device group may communicate with one another so that data may be transmitted between the devices in the device group. For example, the devices in the device group may obtain the same data. After the device group is established, a group identifier may be generated to uniquely identify the device group.

In some embodiments, the data source device may provide data to the devices in the device group, and the data may include multimedia data (e.g., audio data or the like). The data source device may establish a connection to at least one device in the device group and transmit data to the at least one device, which may transmit the data to other devices in the device group so that they may receive the same data. In some embodiments, the data source device may establish connections and transmit data to each device in the device group, respectively, and the devices in the device group may receive the same data.

In an embodiment, a device (referred to as a "first device") in the device group may be paired with the data source device via the group identifier to generate pairing information, and a connection to the data source device may be established based on the pairing information. In some embodiments, the first device may transmit the pairing information to another device in the device group (e.g., a second device). In this way, when the second device in the device group needs to establish a connection to the data source device (e.g., when the first device malfunctions), the second device may do so in accordance with the pairing information without performing the pairing process with the data source device, thus increasing communication reliability. Because the second device does not need to pair with the data source device when establishing a connection to the data source device, the connection may be established without user awareness. This enhances user experience, increases efficiency of establishing a connection, and improves the communication efficiency.

Figure 2:
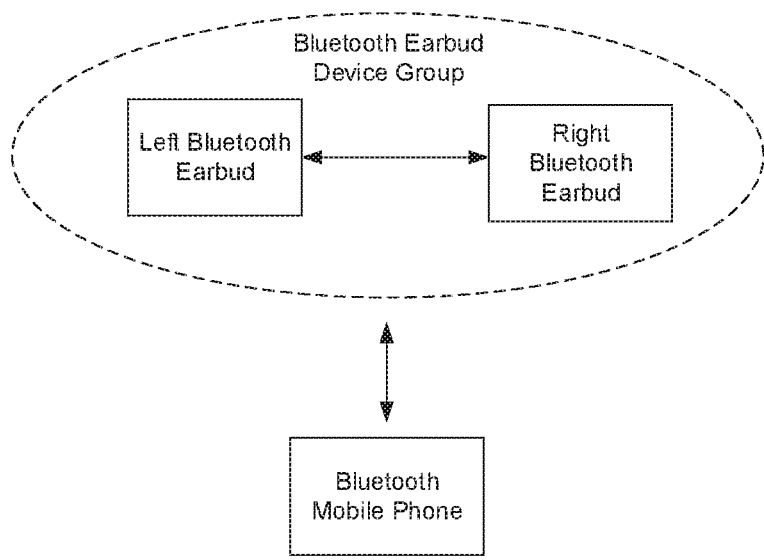
FIG. 2 is a diagram of an exemplary application scenario consistent with embodiments of this disclosure.

FIG. 2 is a diagram of an exemplary application scenario 200 consistent with embodiments of this disclosure. Referring to FIG. 2, the application scenario 200 includes a left Bluetooth® earbud, a right Bluetooth® earbud, and a Bluetooth® mobile phone. The left Bluetooth® earbud and the right Bluetooth® earbud may be paired and connected to form a Bluetooth® earbud device group, and a Bluetooth® earbud group identifier may be generated.

In some embodiments, the Bluetooth® mobile phone may be used to provide the same audio data to the left Bluetooth® earbud and the right Bluetooth® earbud. In some embodiments, the left Bluetooth® earbud may pair with the Bluetooth® mobile phone via the Bluetooth® earbud group identifier to generate pairing information and establish a connection to the Bluetooth® mobile phone in accordance with the pairing information. After the left Bluetooth® earbud establishes the connection to the Bluetooth® mobile phone, the left Bluetooth® earbud may receive data from the Bluetooth® mobile phone and provide the received data to the right Bluetooth® earbud.

In some embodiments, the left Bluetooth® earbud may transmit the pairing information to the right Bluetooth® earbud. In this way, when the left Bluetooth® earbud is malfunctioning, the right Bluetooth® earbud may establish a connection to the Bluetooth® mobile phone in accordance with the pairing information. Therefore, when the left Bluetooth® earbud is malfunctioning, the problem that the right Bluetooth® earbud is unable to transmit data to the Bluetooth® mobile phone may be avoided, thus increasing the communication reliability. Because the right Bluetooth® earbud does not need to pair with the Bluetooth® mobile phone when establishing a connection to the Bluetooth® mobile phone, the establishment of the connection may be implemented between the right Bluetooth® earbud and the Bluetooth® mobile phone without user awareness. This not only enhances the user experience, but also increases the efficiency of establishing a connection, thereby improving the communication efficiency.

It is noted that FIG. 2 is an illustrative and non-limiting example of an application scenario. The application scenario may be configured differently in accordance with actual needs, and this disclosure does not have limitation in that regard.

Exemplary embodiments are provided below to explain in detail the technical solutions of this application. It is noted that the exemplary embodiments below may be combined with one another, and the same or similar content in different exemplary embodiments are not repeated.

Figure 3:
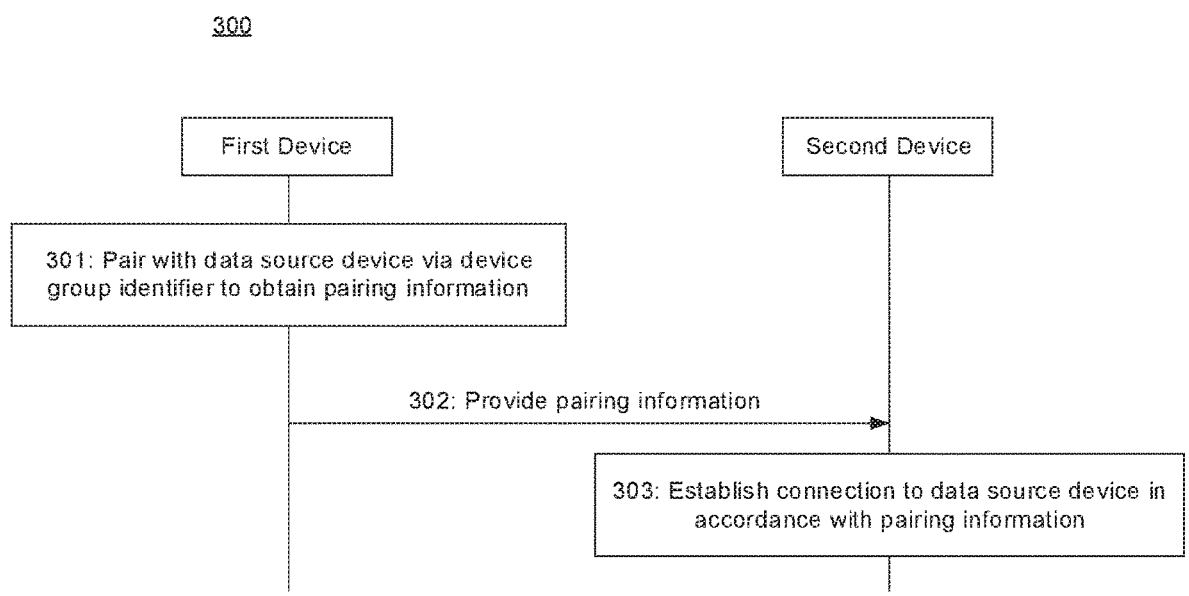
FIG. 3 is a flow diagram of an exemplary communication method consistent with embodiments of this disclosure.

FIG. 3 is a flow diagram of an exemplary communication method 300 consistent with embodiments of this disclosure. Referring to FIG. 3, the method 300 include the following steps.

At step 301, a first device is paired with a data source device via a group identifier to obtain pairing information.

In some embodiments, the group identifier may identify a device group that includes at least two devices. The first device may be any one of the devices in the device group.

In some embodiments, the devices in the device group may communicate with one another so that data may be transmitted between the devices in the device group. FIGS. 4A-4D are provided as examples to explain the connection (e.g., a wired or wireless communication connection) between the devices in the device group.

Figure 4A:
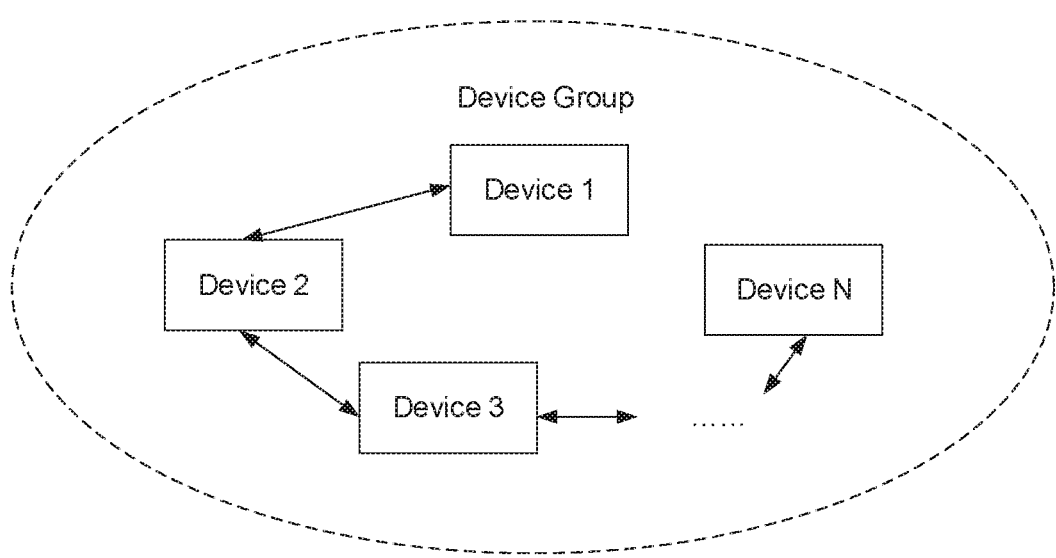
FIG. 4A is a schematic diagram illustrating an exemplary device connection pattern consistent with embodiments of this disclosure.

FIG. 4A is a schematic diagram illustrating an exemplary device connection pattern 400A consistent with embodiments of this disclosure. Referring to FIG. 4A, devices in the device group may be sequentially connected. For example, device 1 is connected to device 2, device 2 is connected to device 3, and device N−1 is connected to device N. In this way, after any device in the device group receives data, the data may be sequentially transmitted to the other devices via the connection between the devices.

Figure 4B:
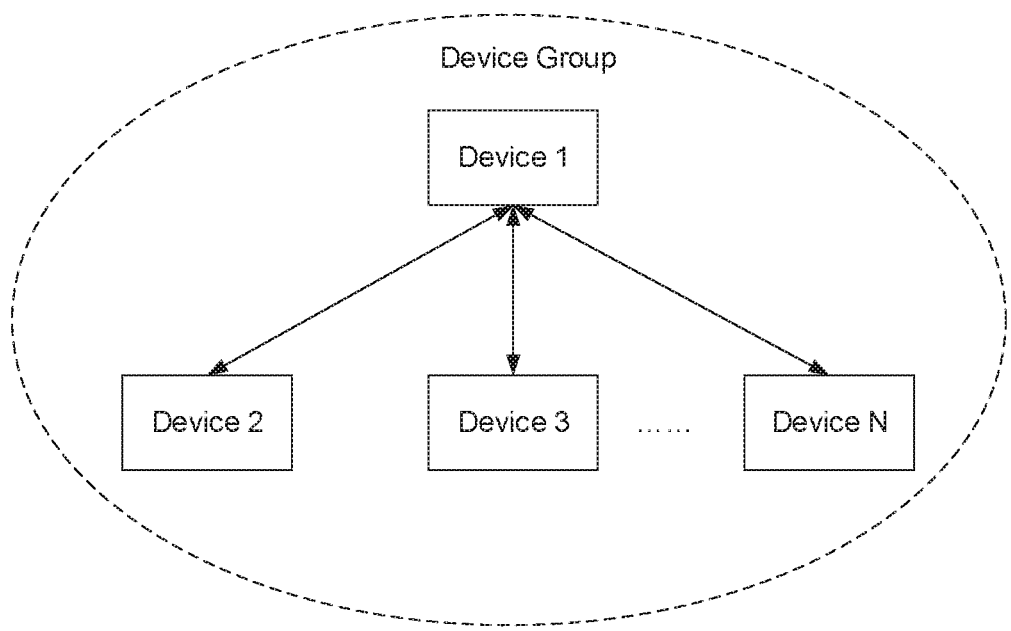
FIG. 4B is a schematic diagram illustrating another exemplary device connection pattern consistent with embodiments of this disclosure.

FIG. 4B is a schematic diagram illustrating an exemplary device connection pattern 400B consistent with embodiments of this disclosure. Referring to FIG. 4B, a device in a device group may be connected to all other devices, respectively, and the device may establish a connection to the data source device. For example, device 1 is connected to device 2, device 3, . . . , and device N, respectively. In this way, after device 1 in the device group receives data from the data source device, the data may be transmitted to the other devices in the group, respectively.

Figure 4C:
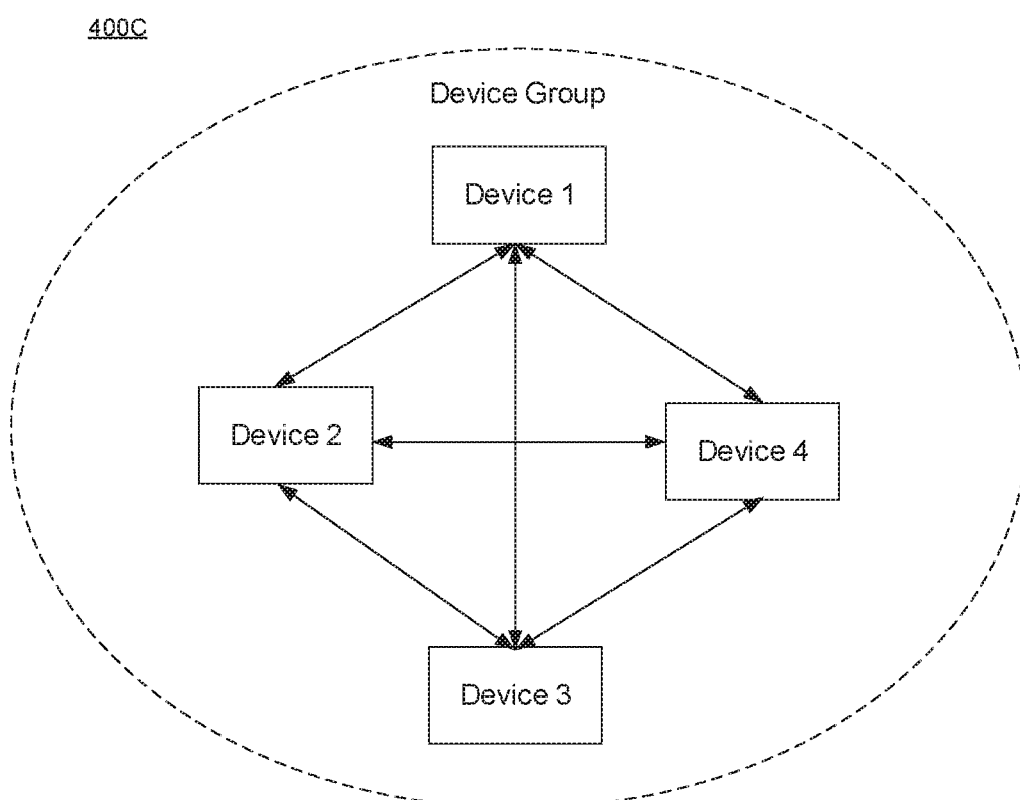
FIG. 4C is a schematic diagram illustrating yet another exemplary device connection pattern consistent with embodiments of this disclosure.

FIG. 4C is a schematic diagram illustrating an exemplary device connection pattern 400C consistent with embodiments of this disclosure. Referring to FIG. 4C, devices in the device group may be connected in pairs. For example, a connection is established between each pair of devices among device 1, device 2, device 3, and device 4. In this way, after any device in the device group receives data, the data may be transmitted to the other devices via the connection between the devices.

Figure 4D:
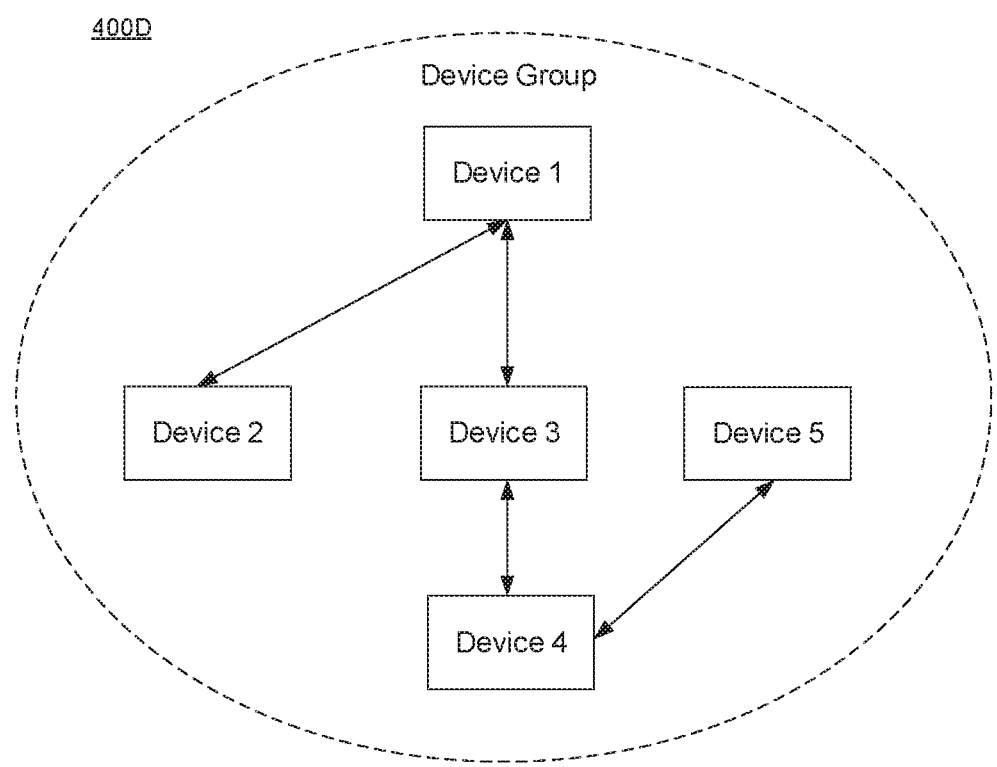
FIG. 4D is a schematic diagram illustrating yet another exemplary device connection pattern consistent with embodiments of this disclosure.

FIG. 4D is a schematic diagram illustrating an exemplary device connection pattern 400D consistent with embodiments of this disclosure. Referring to FIG. 4D, each device in the device group may be connected to at least one of the other devices. For example, device 1 is connected to device 2 and device 3, and device 4 is connected to device 3 and device 5. In this way, after any device in the device group receives data, the data may be transmitted to the other devices via the connection between the devices.

It is noted that FIGS. 4A-4D are illustrative and non-limiting examples of connection relationships between the devices in the device group. The connection relationships between the devices in the device group may be configured differently in accordance with actual needs, and this disclosure does not have limitation in that regard.

The device in the device group may be a wireless transmission-and-reception device or a wired transmission-and-reception device. The device in the device group may have at least one of a reception function or a transmission function. In some embodiments, the wireless transmission-and-reception device may be a Bluetooth® device, such as a Bluetooth® audio device. The Bluetooth® audio device may be a Bluetooth® earbud or a Bluetooth® audio system (e.g., Bluetooth® stereo speakers).

In some embodiments, the group identifier may be determined in accordance with a predetermined rule. For example, the predetermined rule may indicate a format and/or a length for the group identifier.

In some embodiments, the group identifier may be the same as an identifier of one of the devices in the device group. The identifier of the device may be an address of the device. For example, when the device is a Bluetooth® device, the identifier of the device may be a Bluetooth® address of the device. In some embodiments, the identifier of any device in the device group may be determined to be the group identifier. In some embodiments, the identifier of a designated device in the device group may be determined to be the group identifier. The designated device may be the device firstly joining the device group, the device lastly joining the device group, or another device.

In some embodiments, each device in the device group may store the device group information of the device group. For example, the device group information may be stored in the devices in the format of a data structure. In some embodiments, the device group information may include the group identifier and an identifier of each device in the device group.

For example, for a device group includes three devices denoted as device 1, device 2, and device 3, respectively, the device group information may include a group identifier shown as in Table 1.

TABLE 1

| Device group information | |
|---|---|
| Group identifier | Identifiers of devices in the device group |
| Group identifier | Identifier 1 of device 1<br>Identifier 2 of device 2<br>Identifier 3 of device 3 |

It is noted that Table 1 is an illustrative and non-limiting example of the device group information.

In some embodiments, before the first device pairs with the data source device via the group identifier, a status of each device in the device group may be set as visible to one or more devices outside the device group. For example, the group identifier is available to the device outside the device group as identifiers of the devices in the device group, and device identifiers are available to devices inside the device group as identifiers of the devices in the device group.

In some embodiments, the data source device may be one or more devices outside the device group. For each device in the device group, its identifier that is available to the data source device may be the group identifier. Therefore, the data source device may discover the devices in the device group via the group identifier. Because each device in the device group shares the same identifier from the perspective of the data source device, the device discovered by the data source device based on the group identifier may be any device in the device group.

In some embodiments, after the data source device discovers a first device in the device group based on a group identifier, the data source device may pair with the first device via the group identifier. In an embodiment, the process of pairing the data source device with the first device may include an authentication process.

For example, the process of pairing the data source device with the first device may be as follows. Verification information of the first device may be configured. In some embodiments, the verification information of the first device may be verification information of the device group. When the data source device is pairing with the first device, the verification information of the first device may be inputted into the data source device, and the data source device may transmit to the first device a pairing request that includes the verification information. The pairing is successful when the first device determines that the verification information in the pairing request is the same as the verification information of the first device. In some embodiments, the verification information of the data source device may be configured. When the data source device is pairing with the first device, the verification information of the data source device may be inputted into the first device, and the first device may transmit to the data source device a pairing request that includes the verification information. The pairing is successful when the data source device determines that the verification information in the pairing request is the same as the verification information of the data source device.

In some embodiments, the pairing information may be generated after the first device pairs with the data source device via the group identifier. In some embodiments, the pairing information may be generated in accordance with the group identifier and the identifier of the data source device. It is noted that the process of generating the pairing information may also be based on other information, and this disclosure does not have limitation in that regard.

In some embodiments, the devices in the device group establish a connection to the data source device based on the pairing information. For example, the pairing information may be needed by any device in the device group for establishing a connection to the data source device.

In some embodiments, the pairing information may include a link key for devices in the device group to establish a connection to the data source device. It is noted that the pairing information may also include other content, and this disclosure does not have limitation in that regard.

In some embodiments, after the first device obtains the pairing information generated, a connection may be established between the first device and the data source device in accordance with the pairing information.

Referring back to FIG. 3, at step 302, the pairing information is provided from the first device to at least one second device in the device group. For example, the pairing information may be synchronized between the first device and the at least one second device.

In some embodiments, the at least one second device may include one device or multiple devices. In some embodiments, the at least one second device may include all devices in the device group except the first device.

For example, M (an integer greater than or equal to one) is the number of the at least one second device, where the M second devices may be any M devices in the device group except the first device, or M designated devices in the device group except the first device.

In some embodiments, the first device may provide the pairing information to the at least one second device in at least two ways.

A first way may be as follows. A predetermined storage area may be allocated for the devices in the device group. All the devices in the device group may access the predetermined storage area. The first device may store the pairing information in the predetermined storage area, and, accordingly, the other devices in the device group may read the pairing information from the predetermined storage area.

In the first way, the pairing information may be provided from the first device to the at least one second device via the predetermined storage area so that the first device does not need to individually transmit the pairing information to each of the at least one second device, and thus reduce the power consumption of the first device.

A second way may be as follows. The first device may transmit the pairing information to the at least one second device. For example, the first device may transmit the pairing information to the at least one second device by at least one of a wired method or a wireless method.

In some embodiments, the first device may directly transmit the pairing information to the second device. For example, the first device may transmit the pairing information to each of the second devices, respectively. In some embodiments, the first device may indirectly transmit the pairing information to the second devices. For example, the first device may transmit the pairing information to one of the second devices, and the one of the second devices may transmit the pairing information to the other second devices.

Still referring to FIG. 3, at step 303, a connection is established between the second device and the data source device in accordance with the pairing information.

In some embodiments, when a predetermined condition is met, the second device may establish the connection to the data source device using the pairing information.

In some embodiments, the predetermined condition may include at least one of: a link between the first device and the data source device being malfunctioning; battery power of the first device being below a first threshold; a status of the first device being abnormal; or a quality of a signal between the first device and the data source device being below a second threshold.

In some embodiments, the device status of the first device is determined as abnormal when the first device is in a pause status, a malfunction status, or the like. For example, when the first device is a Bluetooth® earbud, the status of the first device may be a detached earbud status (e.g., the first device is not in the ear of a user), which may be determined as an abnormal state.

In some embodiments, the quality of the signal between the first device and the data source device may include the signal strength of the signal between the first device and the data source device, or the like.

In some embodiments, the data source device may detect the predetermined condition. When the data source device determines that the predetermined condition exists and is met, the data source device may request to establish a connection to the second device. After the request for establishing the connection is received by the second device, the second device may establish a connection to the data source device using the pairing information.

In some embodiments, the second device may detect the predetermined condition. When the second device determines that the predetermined condition exists and is met, the second device may transmit a request for establishing a connection to the data source device. The request for establishing the connection may include pairing information, and the data source device may receive the request for establishing the connection from the second device based on the pairing information and establish the connection between the second device and the data source device.

In the communication method 300, after a first device pairs with a data source device via a group identifier to obtain pairing information, the first device may transmit pairing information to at least one second device in the device group to cause the second device to establish a connection to the data source device using the pairing information. When the second device in the device group is establishing the connection to the data source device (e.g., when the first device malfunctions), the second device may do so using the pairing information without performing the pairing process with the data source device, thus increasing the communication reliability. Because the second device does not need to pair with the data source device when establishing a connection to the data source device, the connection may be implemented without user awareness. This not only enhances the user experience, but also increases the efficiency of establishing a connection, thereby improving the communication efficiency.

Figure 5:
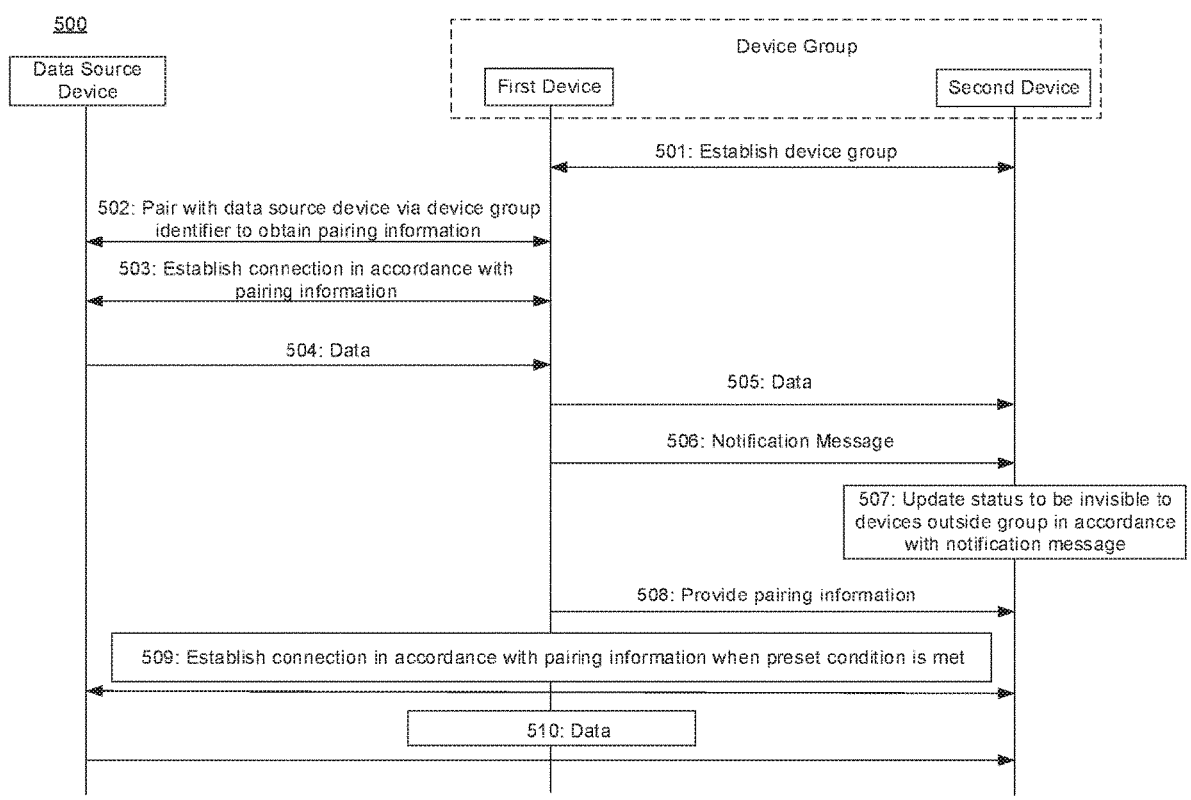
FIG. 5 is a flow diagram of another exemplary communication method consistent with embodiments of this disclosure.

In reference to FIG. 5, an explanation of the communication method is provided using an example of a device group including a first device and a second device.

FIG. 5 is a flow diagram of an exemplary communication method 500 consistent with embodiments of this disclosure. Referring to FIG. 5, the method includes the following steps.

At step 501, a device group is established, the device group including a first device and at least one second device.

In some embodiments, the device group may be formed by pairing and connecting a plurality of devices (including the first device and the at least one second device) by the manufacturer before leaving the factory. In some embodiments, the device group may be formed by pairing and connecting a plurality of devices (including the first device and the at least one second device) by a user during use.

In some embodiments, during the process of establishing the device group, or after the device group is established, a group identifier may be generated. The device group may be uniquely identified via the group identifier. The group identifier may be as illustrated at step 301 and the details of which are no provided hereinafter.

In some embodiments, the device group may be established by at least two ways.

A first way may be as follows. The device group may include two devices. An instruction for establishing the device group may be inputted, and the two devices may be paired and connected for establishing the device group.

For example, the device group includes one left Bluetooth® earbud and one right Bluetooth® earbud. An instruction for establishing a device group may first be inputted into the left Bluetooth® earbud when the device group is being established. For example, a press operation may be performed on a first predetermined button of the left Bluetooth® earbud for inputting the instruction for establishing the device group. After the instruction for establishing the device group is inputted, the left Bluetooth® earbud and the right Bluetooth® earbud may be paired and connected. The device group is successfully established when the left Bluetooth® earbud and the right Bluetooth® earbud are successfully paired and connected. For example, the pairing and connecting of the left Bluetooth® earbud and the right Bluetooth® earbud may be implemented by pressing predetermined buttons of the left Bluetooth® earbud and the right Bluetooth® earbud.

A second way may be as follows. The device group may include more than two devices. An instruction for establishing a device group may be inputted, two of the devices in the device group may be paired and connected to join the device group, and other devices may be paired with and connected to the devices in the device group to join the device group. After the device group has been established, an instruction for completing the establishment of the device group may be inputted.

For example, the device group includes Bluetooth® speaker 1, Bluetooth® speaker 2, and Bluetooth® speaker 3. An instruction for establishing a device group may be inputted into Bluetooth® speaker 1 when the device group is being established. For example, a first press operation may be performed on a predetermined button of Bluetooth® speaker 1 for inputting the instruction for establishing the device group. After the instruction for establishing the device group is inputted, Bluetooth® speaker 1 and Bluetooth® speaker 2 may be paired and connected. After Bluetooth® speaker 1 and Bluetooth® speaker 2 are successfully paired and connected, the device group including Bluetooth® speaker 1 and Bluetooth® speaker 2 is established. Then Bluetooth® speaker 3 and Bluetooth® speaker 1 may be paired and connected for joining the Bluetooth® speaker 3 to the device group. After the device group has been established, an instruction for completing the establishment of the device group may be inputted. For example, a second press operation may be performed on a predetermined button for inputting the instruction for completing the establishment of the device group.

It is noted that the above exemplary embodiment is an illustrative and non-limiting example of a method for establishing the device group. The device group may be established differently in accordance with actual needs, and this disclosure does not have limitation in that regard.

Still referring to FIG. 5, at step 502, the first device is paired with a data source device via a group identifier to obtain pairing information. It is noted that the step 502 may be implemented in a similar way to the step 301, and the details of which are no provided hereinafter.

At step 503, a connection is established between the first device and the data source device using the pairing information.

In some embodiments, the first device may request to establish a connection to the data source device. For example, the first device may transmit a request for establishing a connection to the data source device. The request for establishing a connection may include the pairing information, and the data source device may accept the request from the first device for establishing a connection based on the pairing information, thereby establishing a connection between the first device and the data source device.

In some embodiments, the data source device may request to establish a connection to the first device. For example, the data source device may transmit a request for establishing a connection to the first device. The request for establishing a connection may include the identifier of the data source device, and the first device may accept the request for establishing a connection from the data source device based on the identifier and the pairing information of the data source device, thereby establishing a connection between the first device and the data source device.

Still referring to FIG. 5, at step 504, data is transmitted from the data source device to the first device. For example, when the first device is a Bluetooth® earbud, the data transmitted from the data source device to the first device may include Bluetooth® audio data.

At step 505, the received data is provided from the first device to the second device. It is noted that after the connection is established between the first device and the data source device, the data source device may transmit data to the first device, and the first device may provide the received data to other devices in the device group.

In some embodiments, the first device may provide the received data to the second device by various ways.

A first way may be as follows. A shared memory may be allocated to the devices in the device group, and all the devices in the device group may access to the shared memory. The first device may store the received data (e.g., the pairing information) in the shared memory, and, accordingly, the other devices in the device group may read the received data (e.g., the pairing information) from the shared memory.

In the first way, the received data may be provided from the first device to at least one second device via the shared memory so that the first device does not need to individually transmit the received data to each second device, and thus the power consumption of the first device may be reduced.

A second way may be as follows. The first device may transmit the received data to the second device. For example, the first device may transmit the received data to the second device by a wired and/or wireless method.

It is noted that in some implementations the steps 504-505 may be omitted.

Still referring to FIG. 5, at step 506, a notification message is transmitted from the first device to the second device.

In some embodiments, the notification message may be used to instruct the status of the second device to be updated to be invisible to one or more devices outside the device group.

In some embodiments, the second device may be all devices in the device group except the first device. For example, the first device may transmit the notification message to all devices in the device group except the first device.

At step 507, a status of the second device is updated to be invisible to one or more devices outside the device group in accordance with the notification message.

In some embodiments, after the status of the second device is updated to be invisible to the one or more devices outside the device group, the data source device may be unable to discover the second device. In this way, pairing and connecting the data source device to the second device may be avoided.

In some embodiments, after the first device pairs with the data source device, the status of the first device may also be updated to be invisible to the one or more devices outside the device group.

At step 508, the pairing information is provided from the first device to at least one second device. It is noted that the step 508 may be implemented in a way similar to the step 302, and the details of which are no provided hereinafter.

At step 509, a connection between the second device and the data source device is established in accordance with the pairing information when a predetermined condition is met.

It is noted that the step 509 may be implemented in a way similar to the step 303, the details of which are no provided hereinafter.

At step 510, data is transmitted from the data source device to the second device.

It is noted that this disclosure does not limit the order of the steps. For example, steps 504-505, steps 506-507, and step 508 may be performed in sequence or in parallel.

In FIG. 5, after a first device pairs with a data source device via a group identifier to obtain pairing information, the first device may transmit the pairing information to at least one second device in the device group. The second device may establish a connection to the data source device using the pairing information when a predetermined condition is met. When the second device in the device group is establishing the connection to the data source device (e.g., when the first device malfunctions), the second device may do so using the pairing information without performing the pairing process with the data source device, thus increasing the communication reliability. Because the second device does not need to pair with the data source device when establishing a connection to the data source device, the connection may be implemented without user awareness. This not only enhances the user experience, but also increases the efficiency of establishing a connection, thereby improving the communication efficiency.

Figure 6:
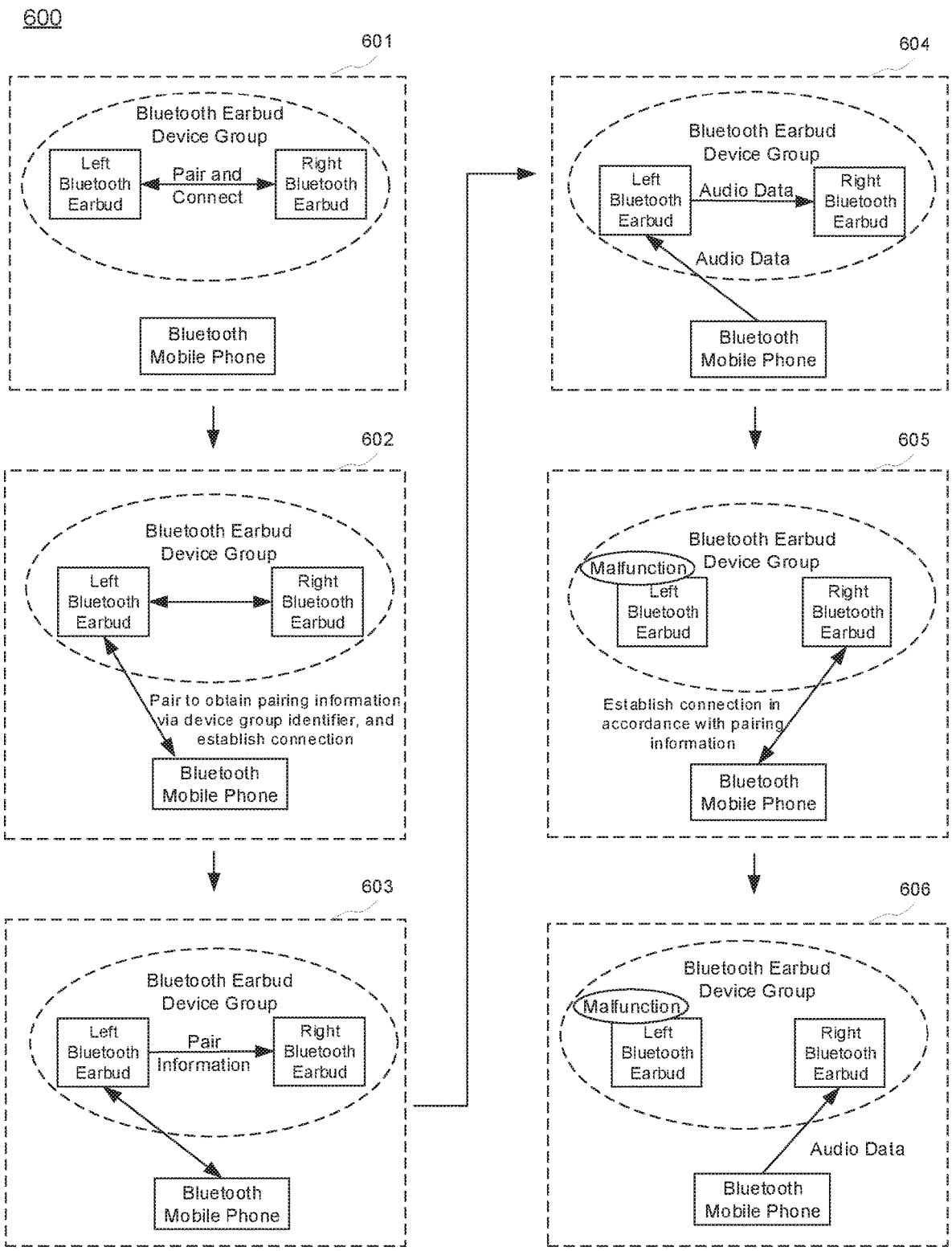
FIG. 6 is a schematic diagram illustrating an exemplary communication process consistent with embodiments of this disclosure.

In reference to FIG. 6, a detailed explanation of the communication method is provided using an example, in which the first device is a left Bluetooth® earbud, the second device is a right Bluetooth® earbud, and the data source device is a Bluetooth® mobile phone.

FIG. 6 is a schematic diagram illustrating an example communication process 600 consistent with embodiments of this disclosure. Referring to FIG. 6, the communication process includes processes 601 through 606.

Referring to process 601, a left Bluetooth® earbud and a right Bluetooth® earbud form a Bluetooth® earbud device group by pairing and connecting.

Referring to process 602, the left Bluetooth® earbud may pair with the Bluetooth® mobile phone to obtain pairing information via a group identifier (e.g., a Bluetooth® earbud group identifier), and a connection is established between the left Bluetooth® earbud and the Bluetooth® mobile phone via the pairing information.

Referring to process 603, the left Bluetooth® earbud transmits the pairing information obtained from pairing with the Bluetooth® mobile phone to the right Bluetooth® earbud.

Referring to process 604, the Bluetooth® mobile phone transmits audio data to the left Bluetooth® earbud, and the left Bluetooth® earbud transmits the audio data to the right Bluetooth® earbud.

Referring to process 605, a connection is established between the right Bluetooth® earbud and the Bluetooth® mobile phone using the pairing information when the left Bluetooth® earbud is malfunctioning.

Referring to process 606, the Bluetooth® mobile phone transmits audio data to the right Bluetooth® earbud.

In FIG. 6, a right Bluetooth® earbud and a left Bluetooth® earbud may be paired and connected for establishing a Bluetooth® earbud device group. The left Bluetooth® earbud may pair with the Bluetooth® mobile phone via the group identifier to obtain pairing information and transmits the pairing information to the right Bluetooth® earbud. After a connection is established between the left Bluetooth® earbud and the Bluetooth® mobile phone via the pairing information, the Bluetooth® mobile phone may transmit audio data to the left Bluetooth® earbud, and the left Bluetooth® earbud transmits the data to the right Bluetooth® earbud. When the left Bluetooth® earbud is malfunctioning, a direct connection may be established between the right Bluetooth® earbud and the Bluetooth® mobile phone via the pairing information so that the Bluetooth® mobile phone may transmit audio data to the right Bluetooth® earbud. When the left Bluetooth® earbud is malfunctioning, the right Bluetooth® earbud may establish a connection to the Bluetooth® mobile phone and receive audio data transmitted from the Bluetooth® mobile phone, thus increasing the communication reliability. When a connection is being established from the right Bluetooth® earbud to the Bluetooth® mobile phone, the connection may be established directly using the pairing information, and there is no need to pair again. Therefore, the connection may be implemented without user awareness. This not only enhances the user experience, but also increases the efficiency of establishing a connection, thereby improving the communication efficiency.

Figure 7:
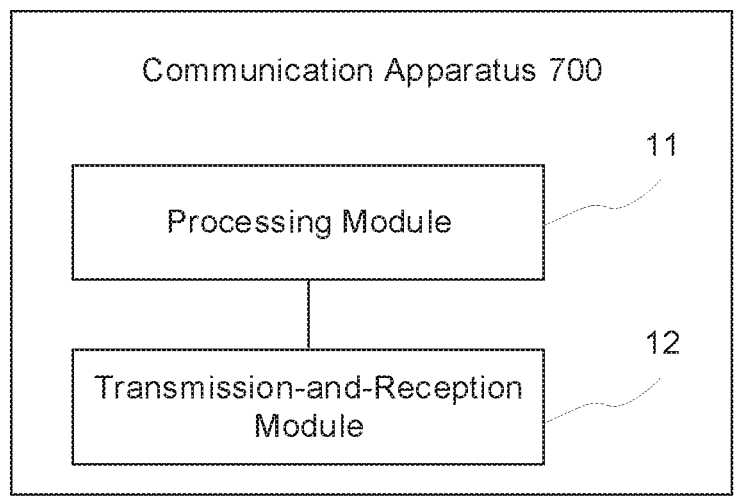
FIG. 7 is a block diagram of an exemplary communication apparatus consistent with embodiments of this disclosure.

FIG. 7 is a block diagram of an exemplary communication apparatus 700 consistent with embodiments of this disclosure. The apparatus 700 may be implemented as a first device, and the apparatus 700 includes a processing module 11 and a transmission-and-reception module 12.

In some embodiments, the processing module 11 may pair with a data source device via a group identifier to obtain pairing information. The first device may be any device in the device group, and the pairing information may include the information based on which the devices in the device group establish a connection to the data source device. The transmission-and-reception module 12 may be configured to provide the pairing information to at least one second device in the device group.

The apparatus 700 may perform the exemplary embodiments of the aforementioned methods, the details of which are not provided hereinafter.

In some embodiments, the pairing information may include a link key.

In some embodiments, the processing module 11 may also be configured to establish a connection to the data source device in accordance with the pairing information after the processing module 11 pairs with the data source device via the group identifier to obtain pairing information.

In some embodiments, the pairing information may be used by the second device to establish a connection to the data source device. In some embodiments, the pairing information may be used by the second device to establish the connection to the data source device when a predetermined condition is met.

In some embodiments, the predetermined condition may include at least one of: a link between the first device and the data source device being malfunctioning; battery power of the first device being below a first threshold; a status of the first device being abnormal; or a quality of a signal between the first device and the data source device being below a second threshold.

In some embodiments, the transmission-and-reception module 12 may be configured to store the pairing information in a predetermined storage area that is accessible to the at least one second device.

In some embodiments, the transmission-and-reception module 12 may be configured to transmit the pairing information to the at least one second device.

In some embodiments, the at least one second device may be a device in the device group except the first device.

In some embodiments, the transmission-and-reception module 12 may be configured to transmit a notification message to other devices in the device group except the first device after the processing module 11 pairs with the data source device via the group identifier to obtain the pairing information. The notification message may be used for updating the status of the other devices to be invisible to one or more devices outside the device group.

In some embodiments, before the processing module 11 pairs with the data source device via the group identifier to obtain the pairing information, the status of each device in the device group may be set as visible to one or more devices outside the device group.

In some embodiments, the statuses of the devices in the device group are set as visible to devices outside the device group, and the devices in the device group are identified to the devices outside the device group by the group identifier.

In some embodiments, the processing module 11 may be further configured to pair with and connecting to other devices in the device group to establish the device group before the processing module 11 pairs with the data source device via the group identifier to obtain the pairing information.

In some embodiments, the group identifier may be determined in accordance with a predetermined rule.

In some embodiments, the group identifier may be the same as an identifier of one of the devices in the device group.

In some embodiments, at least one device in the device group may be a wireless transmission-and-reception device or a wired transmission-and-reception device.

In some embodiments, the wireless transmission-and-reception device may be a Bluetooth® device.

In some embodiments, the Bluetooth® device may be a Bluetooth® audio device.

In some embodiments, the Bluetooth® audio device may be a Bluetooth® earbud or a Bluetooth® audio system (e.g., Bluetooth® stereo speakers).

The apparatus 700 may perform the technical solutions illustrated by the aforementioned exemplary embodiments, the details of which are not provided hereinafter.

Figure 8:
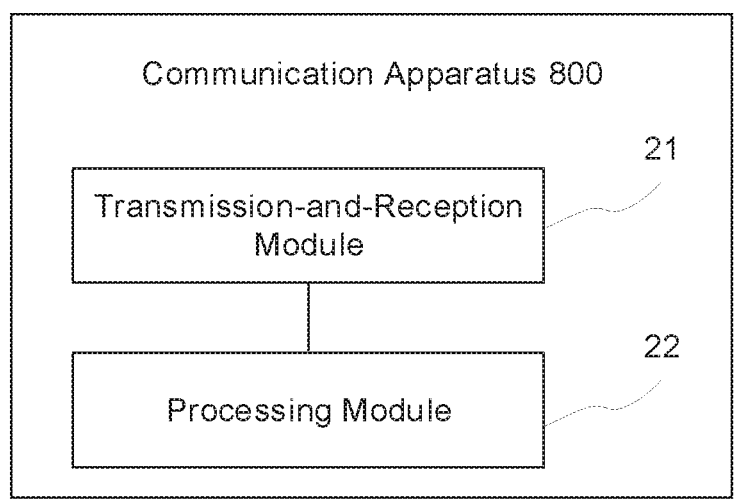
FIG. 8 is a block diagram of another communication apparatus consistent with embodiments of this disclosure.

FIG. 8 is a schematic diagram of another communication apparatus 800 consistent with embodiments of this disclosure. The apparatus 800 may be implemented as a second device, and the apparatus 800 includes a transmission-and-reception module 21 and a processing module 22.

In some embodiments, the transmission-and-reception module 21 may be configured to obtain pairing information provided from a first device. The first device and the second device may be devices in the same device group, and the pairing information may be generated by pairing the first device with the data source device via the group identifier. The processing module 22 may be configured to establish a connection to the data source device using the pairing information.

The apparatus 800 may perform the technical solutions illustrated by the aforementioned exemplary embodiments, the details of which are not provided hereinafter.

In some embodiments, the processing module 22 may be configured to establish a connection to the data source device using the pairing information when a predetermined condition is met.

In some embodiments, the predetermined condition may include at least one of: a link between the first device and the data source device being malfunctioning; battery energy of the first device being below a first threshold; a status of the first device being abnormal; or a quality of a signal between the first device and the data source device being below a second threshold.

In some embodiments, the transmission-and-reception module 21 may be configured to obtain the pairing information in a predetermined storage area, and the pairing information may be stored in the predetermined storage area by the first device.

In some embodiments, the transmission-and-reception module 21 may be configured to receive the pairing information transmitted from the first device.

In some embodiments, the transmission-and-reception module 21 may be configured to receive a notification message transmitted from the first device after the transmission-and-reception module 21 obtains the pairing information provided from the first device. The processing module 22 may be configured to update the status of the second device to be invisible to one or more devices outside the device group in accordance with the notification message.

Figure 9:
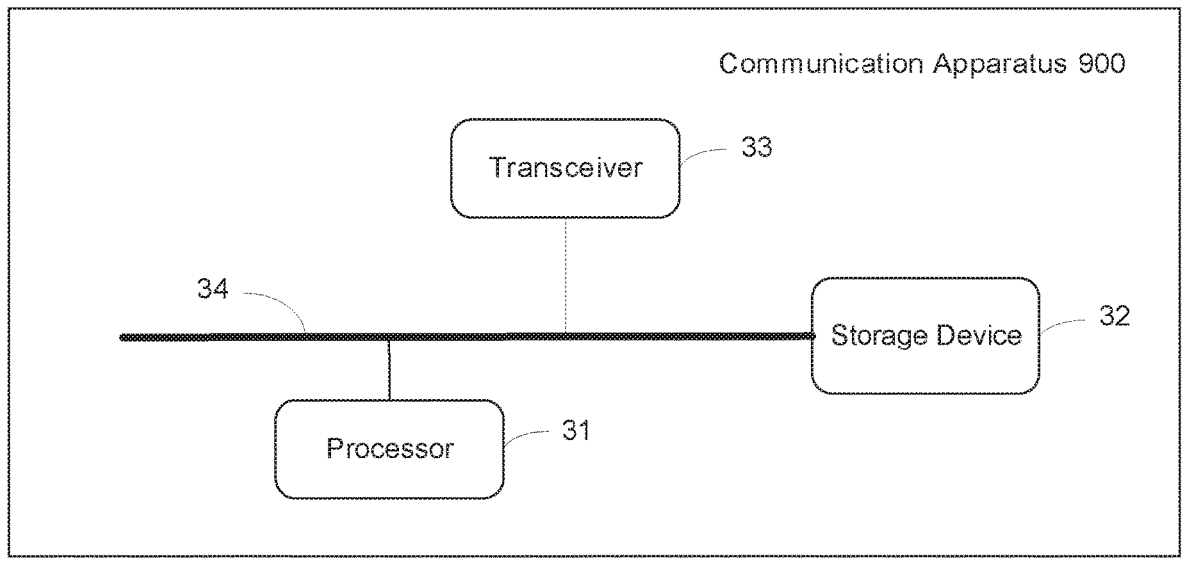
FIG. 9 is a block diagram of hardware of an exemplary communication apparatus consistent with embodiments of this disclosure.

FIG. 9 is a block diagram of an exemplary communication apparatus 900 consistent with embodiments of this disclosure. Referring to FIG. 9, the apparatus 900 includes a processor 31, a storage device 32, and a transceiver 33. The processor 31 and the storage device 32 may communicate with each other. The processor 31, the storage device 32, and the transceiver 33 may communicate via a communication bus 34. The storage device 32 may be used for storing a computer program, and the processor 31 may execute the computer program to implement the aforementioned communication method. For example, the processor 31 may execute the method performed by the first device described above.

Figure 10:
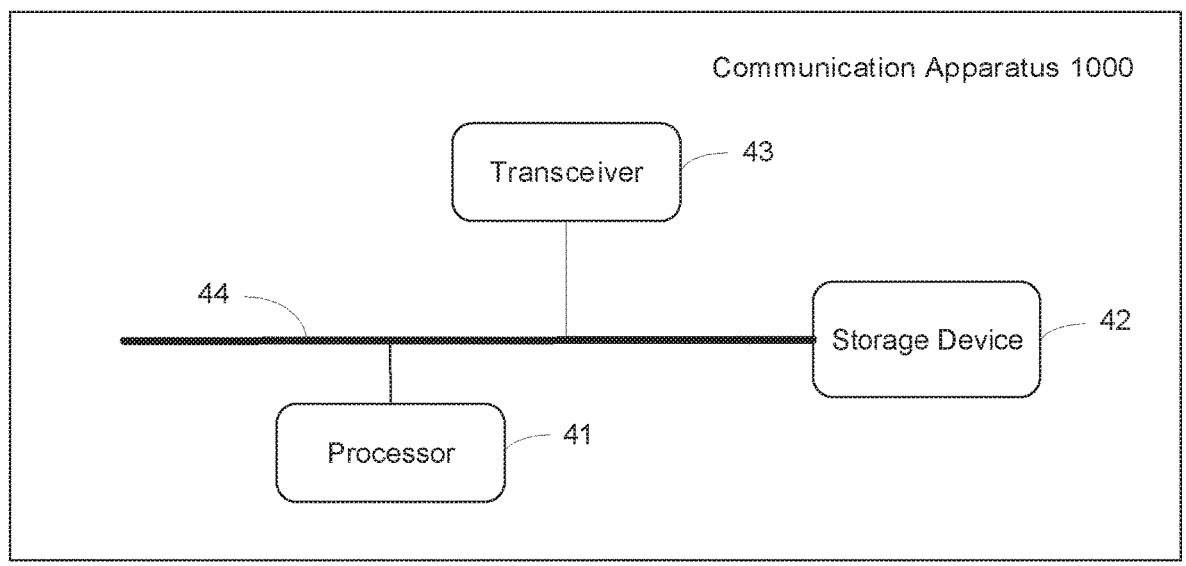
FIG. 10 is a block diagram of hardware of another exemplary communication apparatus consistent with embodiments of this disclosure.

FIG. 10 is a schematic diagram of another exemplary communication apparatus 1000 consistent with embodiments of this disclosure. Referring to FIG. 10, the apparatus 1000 includes a processor 41, a storage device 42, and a transceiver 43, wherein the processor 41 and the storage device 42 may communicate with each other. The processor 41, the storage device 42, and the transceiver 43 may communicate via a communication bus 44. The storage device 42 may be used for storing a computer program, and the processor 41 may execute the computer program to implement the aforementioned communication method. For example, the processor 41 may execute the method performed by the second device described above.

In some embodiments, the processor may be a central processing unit (CPU) or another general or special purpose processor, a digital signal processor (DSP), an application-specific integrated circuit (ASIC), or the like. The general-purpose processor may be a microprocessor or any other processor. The steps in the exemplary embodiments of the methods may be directly executed and completed by a hardware processor, or by a combination of hardware and software modules in the processor for execution and completion.

A device group is also provided herein, which includes the apparatus 900 in FIG. 9 and at least one apparatus 1000 in FIG. 10. For example, the device group may include a first device and at least one second device.

A communication system is also provided herein, which includes the aforementioned device group and data source device. The devices in the device group may be used for pairing with the data source device via the group identifier. The device group and the data source device may also establish a connection for transmitting and receiving data. The processes of data transmission and reception are provided in the aforementioned exemplary embodiments, the details of which are not provided hereinafter.

A non-transitory computer-readable storage medium is also provided herein, which includes a computer program stored thereon. The program, when being executed by a processor, may implement a communication method described in the present disclosure.

The implementation of all or part of the steps in each aforementioned exemplary embodiment may be completed by using a program to instruct relevant hardware. The program may be stored on a readable storage device. When the program is being executed, the steps of the aforementioned exemplary embodiments may be performed. The storage device (or storage medium) may include: a read-only memory (ROM), a RAM, a flash memory, a hard drive, a solid-state drive, a magnetic tape, a floppy disk, an optical disk, or any combination thereof.

Embodiments of the present application are described with reference to the flowcharts and the block diagrams of the methods, the devices (systems), and computer program products in accompanying figures. It should be understood that computer program instructions may implement each process or a box in the flowcharts and the block diagrams, or combinations thereof. These computer program instruction may be provided to the processing unit of a general-purpose computer, a special-purpose computer, an embedded processor, or another programmable data processing device to produce a machine. The processor may execute an instruction to produce an apparatus for implementing a designated function in processes of a flowchart or boxes of a block diagram.

These computer program instructions may also be stored on a computer-readable storage device that can direct a computer or another programmable data processing device to work in a specified manner, causing the instructions stored in the computer-readable storage device to produce a manufactured product that includes an instruction apparatus. The instruction apparatus implements the designated function in processes of a flowchart and boxes of a block diagram.

These computer program instructions may also be loaded to a computer or another programmable data processing device, causing a series of operational steps to be executed on the computer or the other programmable device to produce computer-implemented processing. The instructions executed on the computer or the other programmable device provide steps for implementing the designated function in processes of a flowchart and boxes of a block diagram.

Obviously, persons having ordinary skill in the art may make alterations to and variations of the exemplary embodiments of the present application without departing from the essence and scope of the present application. Thus, if such modifications and variations of the exemplary embodiments of the present application fall within the scope and equivalent techniques of the claims of the application, the present application intends to include such alterations and changes.

In the present application, the term "include" and its variations may be non-exclusive. The term "or" and its variations may be meant as "and/or." Terms such as "first," "second," and so forth in the present application are used to distinguish similar objects and do not necessarily describe a particular sequence or order. In the present application, "plurality" refers to two or more than two. "And/or" describes the relationship of related objects and indicates that three relationships may exist. For example, A and/or B may indicate: only A exists, A and B exist simultaneously, or only B exists. The symbol "/" generally indicates an "or" relationship between the objects before and after the symbol.

The invention claimed is:

1. A method for communication, comprising:
after a data source device discovers a first device in a device group based on a group identifier, pairing the first device with the data source device based on the group identifier to obtain pairing information, the device group identifier uniquely identifying the device group, wherein
a status of each device in the device group is set as visible to one or more devices outside the device group,
devices in the device group are identified to the one or more devices outside the device group by the group identifier, and
the pairing information is generated by the first device using the group identifier and an identifier of the data source device;
transmitting a notification message from the first device to one or more other devices in the device group, the notification message including an instruction to update a status of each of the one or more other devices in the device group to be invisible to the one or more devices outside the device group; and
providing the pairing information to a second device in the device group, the pairing information being used for establishing a connection between the second device and the data source.

2. The method of claim 1, wherein the pairing information comprises a link key.

3. The method of claim 1, further comprising:
after pairing the first device with the data source device via the group identifier, establishing a connection between the first device and the data source device using the pairing information.

4. The method of claim 1, wherein the pairing information is used for establishing a connection between the second device and the data source when a predetermined condition is met, and the predetermined condition comprises at least one of:
a link between the first device and the data source device malfunctioning;
a battery power of the first device being below a first threshold;
a status of the first device being abnormal; or a quality of a signal between the first device and the data source device being below a second threshold.

5. The method of claim 1, wherein providing the pairing information to the second device in the device group comprises:
storing, by the first device, the pairing information in a predetermined storage area accessible to the second device.

6. The method of claim 1, wherein providing the pairing information to the second device in the device group comprises:
transmitting the pairing information from the first device to the second device.

7. The method of claim 1, wherein the second device is in the device group, and the second device is different from the first device.

8. The method of claim 1, further comprising:
before pairing the first device with the data source device via the group identifier, pairing and connecting the first device with the one or more other devices in the device group to establish the device group.

9. The method of claim 1, wherein the group identifier is determined in accordance with a predetermined rule.

10. The method of claim 1, wherein the group identifier is the same as an identifier of one of the devices in the device group.

11. The method of claim 1, wherein the devices in the device group comprises a wireless device or a wired device.

12. The method of claim 11, wherein the wireless device comprises a Bluetooth® device.

13. The method of claim 12, wherein the Bluetooth® device comprises a Bluetooth® audio device.

14. The method of claim 13, wherein the Bluetooth® audio device comprises a Bluetooth® earbud or a Bluetooth® audio system.

15. A communication apparatus comprising a storage device and a processor, the processor executing a program instruction in the storage device to implement the method of claim 1.

16. A non-transitory computer-readable storage medium comprising a computer program stored thereon, wherein the computer program, when being executed by a processor, implements the method of claim 1.

17. A method for communication, wherein the method comprises:
before establishing a connection between a first device and a data source device, obtaining, by a second device, pairing information provided by the first device, wherein
the first device and the second device are in a device group,
the pairing information is obtained by pairing the first device with the data source device based on a group identifier, the group identifier uniquely identifying the device group,
before pairing the first device with the data source device via the group identifier to obtain the pairing information, a status of each device in the device group is set as visible to a device outside the device group, and
devices in the device group are identified to the device outside the device group by the group identifier;
receiving, by the second device, a notification message transmitted by the first device and updating, by the second device, a status of the second device to be invisible to the device outside the device group in accordance with the notification message; and
establishing a connection between the second device and the data source device based on the pairing information.

18. The method of claim 17, wherein the connection between the second device and the data source device is established when a predetermined condition is met, and the predetermined condition comprises at least one of:
a link between the first device and the data source device being malfunctioning;
a battery power of the first device being below a first threshold;
a status of the first device being abnormal; or
a quality of a signal between the first device and the data source device being below a second threshold.

19. The method of claim 17, wherein obtaining, by the second device, the pairing information provided by the first device comprises:
obtaining, by the second device, the pairing information stored in a predetermined storage area by the first device.

20. The method of claim 17, wherein obtaining, by the second device, the pairing information provided by the first device comprises:
receiving, by the second device, the pairing information transmitted by the first device.

21. A communication apparatus comprising a storage device and a processor, the processor executing a program instruction in the storage device to implement the method of claim 17.

22. A non-transitory computer-readable storage medium comprising a computer program stored thereon, wherein the computer program, when being executed by a processor, implements the method of claim 17.

23. An apparatus for communication, applied to a first device, the apparatus comprising a processor and a transmission-and-reception device, wherein
the processor is configured to pair with a data source device based on a group identifier to obtain pairing information after the data source device discovers the first device in a device group based on the group identifier, wherein
the first device is any one of devices in the device group,
the group identifier uniquely identifies the device group,
before pairing the first device with the data source device based on the group identifier to obtain the pairing information, a status of each device in the device group is set as visible to one or more devices outside the device group,
the devices in the device group are identified to the one or more devices outside the device group by the group identifier, and
the pairing information is generated by the first device in accordance with the group identifier and an identifier of the data source device;
the transmission-and-reception device is for transmitting a notification message to one or more other devices in the device group, the notification message including an instruction to update a status of each of the one or more other devices in the device group to be invisible to the one or more devices outside the device group; and
the transmission-and-reception device is further for providing the pairing information to a second device in the device group, the pairing information being used for establishing a connection between the second device and the data source device.

24. The apparatus of claim 23, wherein the pairing information comprises a link key.

25. The apparatus of claim 23, wherein the processor is further configured to establish a connection with the data source device in accordance with the pairing information after the processor pairs with the data source device via the group identifier to obtain the pairing information.

26. The apparatus of claim 25, wherein the pairing information is used for establishing a connection between the second device and the data source when a predetermined condition is met, and the predetermined condition comprises at least one of:
 a link between the first device and the data source device malfunctioning;
 a battery power of the first device being below a first threshold;
 a status of the first device being abnormal; or
 a quality of a signal between the first device and the data source device being below a second threshold.

27. The apparatus of claim 23, wherein the transmission-and-reception device is configured to store the pairing information in a predetermined storage area, the predetermined storage area being accessible to the second device.

28. The apparatus of claim 23, wherein the transmission-and-reception device is configured to transmit the pairing information to the second device.

29. The apparatus of claim 23, wherein the second device is in the device group, and the second device is different from the first device.

30. The apparatus of claim 23, wherein the processor is further configured to pair and connect with the one or more other devices in the device group to establish the device group before the processor pairs with the data source device via the group identifier to obtain the pairing information.

31. The apparatus of claim 23, wherein the processor is further configured to determine the group identifier in accordance with a predetermined rule.

32. The apparatus of claim 23, wherein the group identifier is the same as an identifier of one of the devices in the device group.

33. The apparatus of claim 23, wherein the devices in the device group comprises a wireless device or a wired device.

34. The apparatus of claim 33, wherein the wireless device comprises a Bluetooth® device.

35. The apparatus of claim 34, wherein the Bluetooth® device comprises a Bluetooth® audio device.

36. The apparatus of claim 35, wherein the Bluetooth® audio device comprises a Bluetooth® earbud or a Bluetooth® audio system.

37. An apparatus for communication, applied to a second device, the apparatus comprising a processor and a transmission-and-reception device, wherein
 the transmission-and-reception device is configured to obtain pairing information provided by a first device before a connection is established between the first device and a data source device, wherein
  the first device and the second device are in a device group,
  the pairing information is obtained by pairing the first device with the data source device based on a group identifier, the group identifier uniquely identifying the device group,
  before the first device is paired with the data source device via the group identifier to obtain the pairing information, a status of each device in the device group is set as visible to a device outside the device group, and
  devices in the device group are identified to the device outside the device group by the group identifier;
 the transmission-and-reception device is further configured to receive a notification message transmitted by the first device and updating, by the second device, a status of the second device to be invisible to the device outside the device group in accordance with the notification message; and
 the processor is used for establishing configured to establish a connection with the data source device based on the pairing information.

38. The apparatus of claim 37, wherein the processor is configured to establish the connection with the data source device based on the pairing information when a predetermined condition is met, and the predetermined condition comprises at least one of:
 a link between the first device and the data source device being malfunctioning;
 a battery power of the first device being below a first threshold;
 a status of the first device being abnormal; or
 a quality of a signal between the first device and the data source device being below a second threshold.

39. The apparatus of claim 37, wherein the transmission-and-reception device is configured to obtain the pairing information from a predetermined storage area, the pairing information being stored in the predetermined storage area by the first device.

40. The apparatus of claim 37, wherein the transmission-and-reception device is configured to receive the pairing information transmitted by the first device.

41. A device group comprising a first communication apparatus and a second communication apparatus, wherein
 the first communication apparatus comprises a first storage device and a first processor, the first processor executing a first program instruction in the first storage device to implement a first method of:
  after a data source device discovers a first device in a device group based on a group identifier, pairing the first device with the data source device based on the group identifier to obtain pairing information, wherein
   the group identifier uniquely identifies the device group,
   before pairing the first device with the data source device via the group identifier to obtain the pairing information, a status of each device in the device group is set as visible to a device outside the device group,
   devices in the device group are identified to the device outside the device group by the group identifier, and
   the pairing information is generated by the first device using the group identifier and an identifier of the data source device;
  transmitting a notification message from the first device to one or more other devices in the device group, the notification message including an instruction to update a status of each of the one or more other devices in the device group to be invisible to the device outside the device group; and
  providing the pairing information from the first device to a second device in the device group; and
 the second communication apparatus comprises a second storage device and a second processor, the second processor executing a second program instruction in the second storage device to implement a second method of:
before establishing a connection between the first device and the data source device, obtaining, by the second device, the pairing information provided by the first device;
receiving, by the second device, the notification message transmitted by the first device and updating, by the second device, a status of the second device to be invisible to the device outside the device group in accordance with the notification message; and
establishing a connection between the second device and the data source device in accordance with the pairing information.

42. A communication system comprising the device group of claim 41 and the data source device, the devices in the device group being capable of being paired with the data source device via the group identifier.

* * * * *

UNITED STATES PATENT AND TRADEMARK OFFICE
CERTIFICATE OF CORRECTION

PATENT NO. : 11,032,860 B2
APPLICATION NO. : 16/575620
DATED : June 8, 2021
INVENTOR(S) : Guochu Chen Page 1 of 1

It is certified that error appears in the above-identified patent and that said Letters Patent is hereby corrected as shown below:

In the Claims

Claim 18, Column 20, Line 9, "being malfunctioning;" should read --malfunctioning;--.

Claim 37, Column 22, Line 9, "the processor is used for establishing configured" should read --the processor is configured--.

Claim 38, Column 22, Line 19, "being malfunctioning;" should read --malfunctioning;--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*